(12) United States Patent
Lee

(10) Patent No.: US 7,077,229 B2
(45) Date of Patent: Jul. 18, 2006

(54) FOLDING AND PORTABLE ELECTRIC SCOOTER

(76) Inventor: Shuei-Yuan Lee, 7F, No. 100, Sing-Sheng N. Rd., Sec. 2, Taipei (TW)

( * ) Notice: Subject to any disclaimer, the term of this patent is extended or adjusted under 35 U.S.C. 154(b) by 184 days.

(21) Appl. No.: 10/775,700

(22) Filed: Feb. 10, 2004

(65) Prior Publication Data

US 2005/0173175 A1 Aug. 11, 2005

(51) Int. Cl.
*B62K 15/00* (2006.01)

(52) U.S. Cl. .................. 180/220; 180/208; 180/181

(58) Field of Classification Search ............. 180/180, 180/181, 220, 65.1, 908, 208; 280/30, DIG. 5
See application file for complete search history.

(56) References Cited

U.S. PATENT DOCUMENTS

| 3,446,304 | A | * | 5/1969 | Constantin | 180/9.23 |
| 3,887,218 | A | * | 6/1975 | Di Blasi | 280/278 |
| 4,094,374 | A | * | 6/1978 | Adams | 180/208 |
| 4,750,578 | A | * | 6/1988 | Brandenfels | 180/13 |
| 5,265,695 | A | * | 11/1993 | Piazzi | 180/208 |
| 6,273,442 | B1 | * | 8/2001 | Fallon et al. | 280/287 |
| 6,457,544 | B1 | * | 10/2002 | Sung | 180/220 |
| 6,851,498 | B1 | * | 2/2005 | Sauve | 180/208 |
| 2003/0094315 | A1 | * | 5/2003 | White | 180/2.2 |
| 2003/0141121 | A1 | * | 7/2003 | Flowers et al. | 180/65.1 |
| 2004/0031630 | A1 | * | 2/2004 | Roach | 180/65.1 |

* cited by examiner

*Primary Examiner*—Frank Vanaman

(57) ABSTRACT

A folding and portable electric scooter assembled from structural members including a body member, a cover member, a seat frame and handles. When the electric scooter is not in use, a user needs only employ three simple actions to facilitate rapid folding away of a portable electric scooter, namely to fold down handles into the cover member, and fold away the cover member and the seat frame into the body member, whereupon, the user can pull a pull rod configured atop the cover member to easily pull along the electric scooter by means of auxiliary wheels connected to the body member, similar to the pulling of a baggage.

6 Claims, 6 Drawing Sheets

FOLDING AND PORTABLE ELECTRIC SCOOTER

BACKGROUND OF THE INVENTION (a) Field of the Invention

The present invention relates to a scooter, and more particularly to an electric scooter that can be folded away into a baggage-like form which can be carried or auxiliary wheels configured on the electric scooter can be utilized to enable a user to pull along and thereby transport the electric scooter for easy portability.

(b) Description of the Prior Art

A majority of conventional electric scooters cannot be folded away into a baggage-like form, thus when transporting the electric scooter cannot be neatly put away or carried along when traveling on a rapid transit transportation system, and so on. Moreover, bulkiness of the electric scooter makes transporting of the electric scooter difficult.

SUMMARY OF THE INVENTION

A primary objective of the present invention is to provide a configuration that employs three simple actions to facilitate rapid folding away and realizes formation of a portable electric scooter. Prior to usage, the electric scooter can be folded away and thus form a reduced size baggage-like form which can be carried or auxiliary wheels configured on the electric scooter can be utilized to enable a user to pull along the electric scooter onto a rapid transit system or facilitate transport storage thereof. When the user wishes to ride the electric scooter, the user needs only to implement three simple maneuvers to open up the folded scooter, namely to pull open a cover member, a seat frame and handles, thereby quickly assembling the electric scooter ready for the user to ride thereon. Wherein the cover member instantly forms a front frame of the electric scooter, and apart from actualizing functionality as a shield from wind and rain, also provides for an attractive appearance after folding away of the configuration.

Another objective of the present invention is provide a structure with two auxiliary wheels respectively configured on outer sides of a front wheel of a body member, and a pull rod configured on a front edge of a cover member, whereby, when the present invention has been folded away to form a baggage-like form, pulling on the pull rod by the user enables effortlessly pulling along of the electric scooter by means of the auxiliary wheels, similar to pulling along of baggage.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
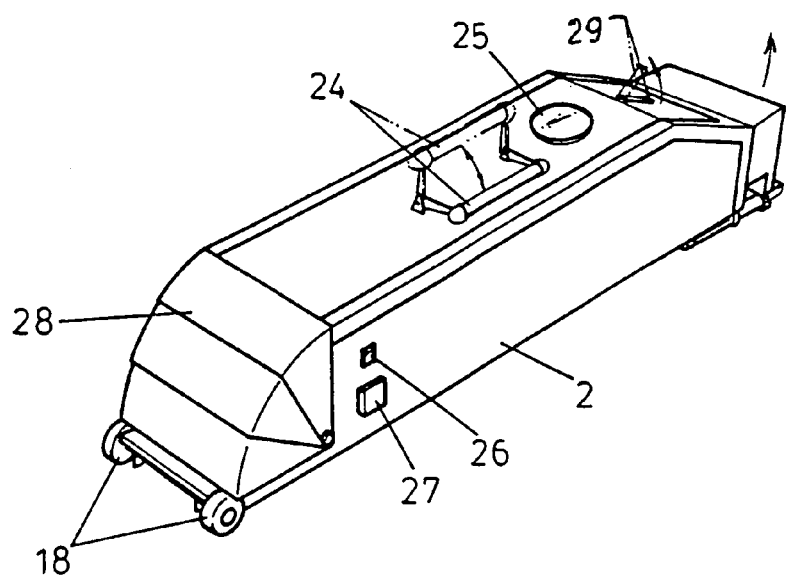
FIG. 1 shows a general view of an electric scooter after folding away according to the present invention.
Figure 2:
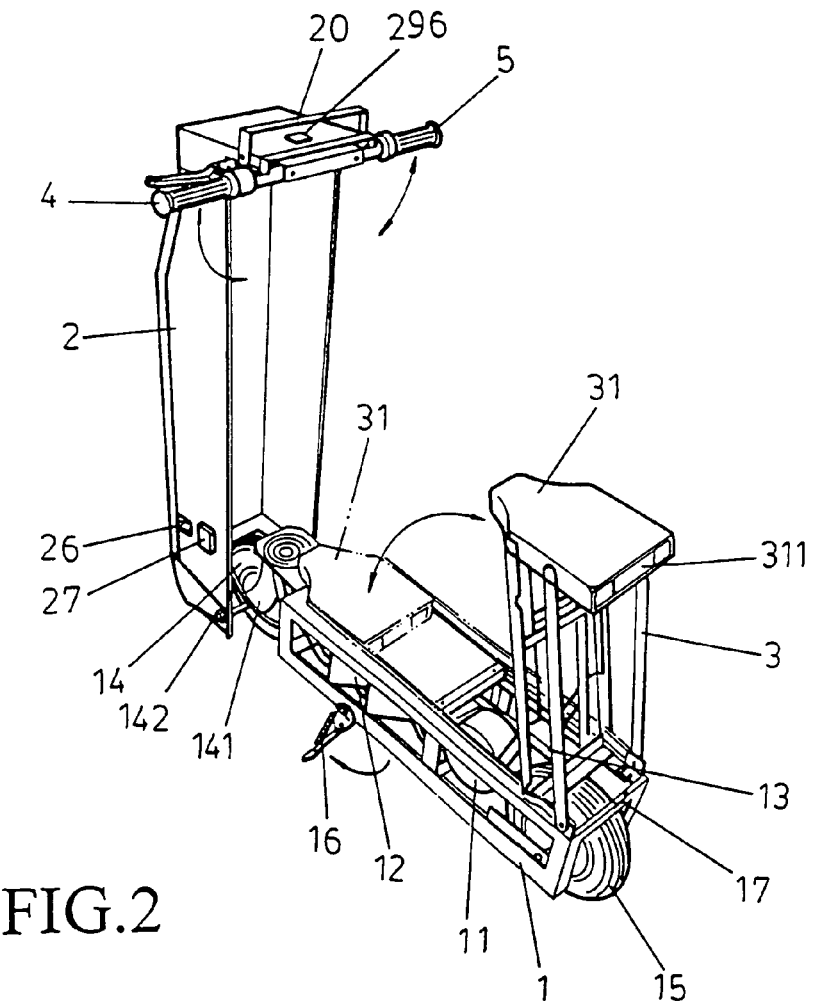
FIG. 2 shows a general view of the electric scooter after opening up according to the present invention.
Figure 5:
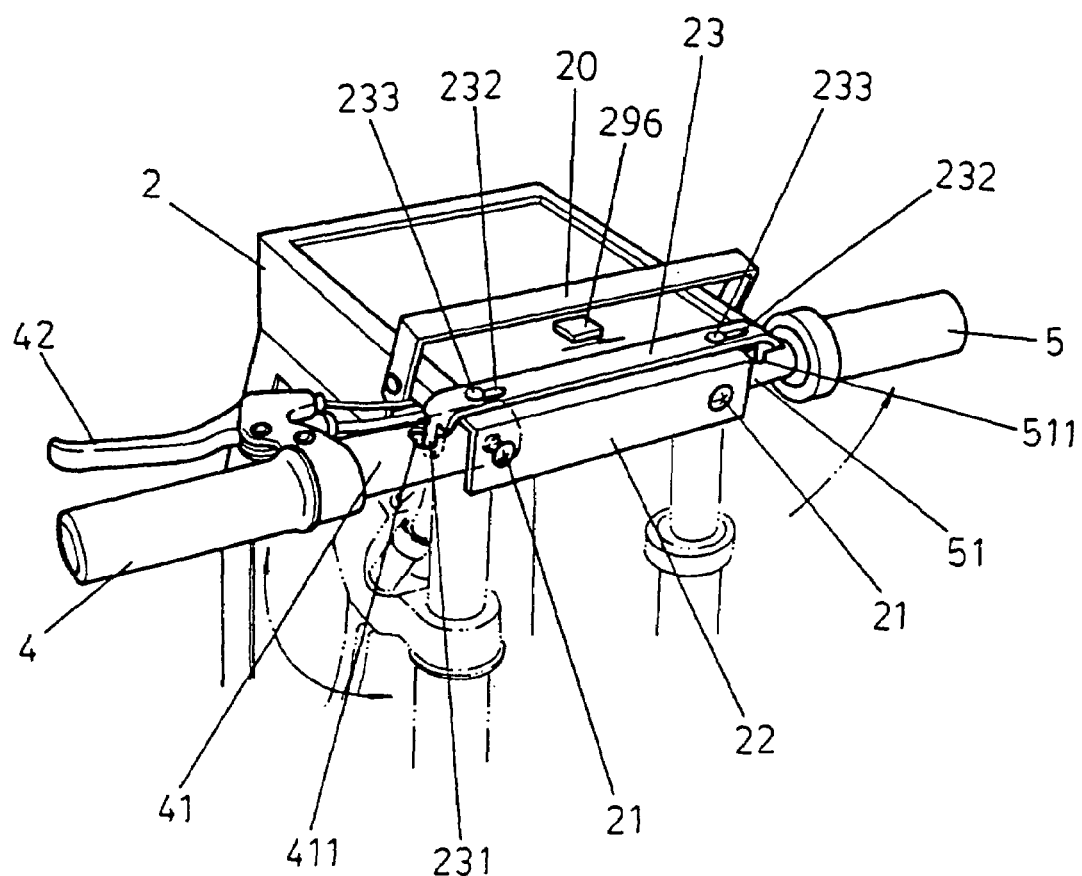
FIG. 5 shows a structural view of a cover member and handles according to the present invention.

Referring to FIGS. 1 and 2, which show structural members of an electric scooter of the present invention primarily comprising a body member, 1, a cover member, 2 a seat frame 3 and two handles 4 and 5. Wherein the body member 1 comprises a rectangular frame, an interior of which is installed a transmission device comprising an electric motor 11, a battery 12 and a belt 13. A front wheel 14 and a rear wheel 15 are pivotally jointed to a front and rear end of the body member 1 respectively. A foot stand 16 is fixedly positioned to a side of the body member 1. The electric motor 11 drives the belt 13, and the belt 13 is wound on a hub at a side of the rear wheel 15. The aforementioned transmission device is of conventional structure, while the present invention is characterized in that:

A wheel frame 141 of the front wheel 14 is pivotally jointed to the cover member 2 by means of a bolt 142, and the cover member 2 is adapted to assume a reverse U-shaped frame cover, therewith enabling complete covering of the body member 1 (see FIGS. 1 and 2). The two handles 4 and 5 respectively secured to two handle bars 41, 51 are configured on a movable end of the cover member 2. As depicted in FIG. 5, a reverse U-shaped bracket 22 is bolted onto the cover member 2 by means of screws 21. A reverse U-shaped fastening bracket 23 is configured atop the reverse U-shaped bracket 22. Opposite ends of the fastening bracket 23 are downwardly bent to respectively form a pair of neck members, and a fastening hook 231 is configured on each said neck member. Fastening holes 411 and 511 are defined in the two handlebars 41 and 51. The fastening holes 411 and 511 provide for respectively engaging the fastening hooks 231 of the fastening bracket 23 A recess hole 232 is defined in each end atop the fastening bracket 23. A fixing bolt 233 is bolted into each recess hole 232, The fastening bracket 23 utilizes the fixing bolts 233 to alter position within the recess holes 232, and thereby facilitate fastening or loosening of the two handle bars 41, 51. Upon the handle bars 41,51 being loosened, the bars 41, 51 can thereby be folded and stored within the cover member 2.

Figure 3:
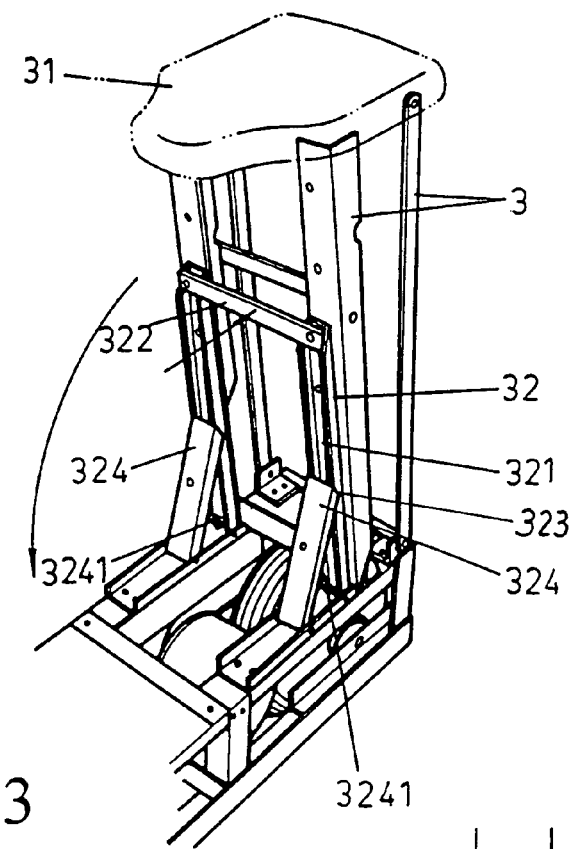
FIG. 3 shows a partial structural view of a seat frame and a body member according to the present invention.
Figure 4:
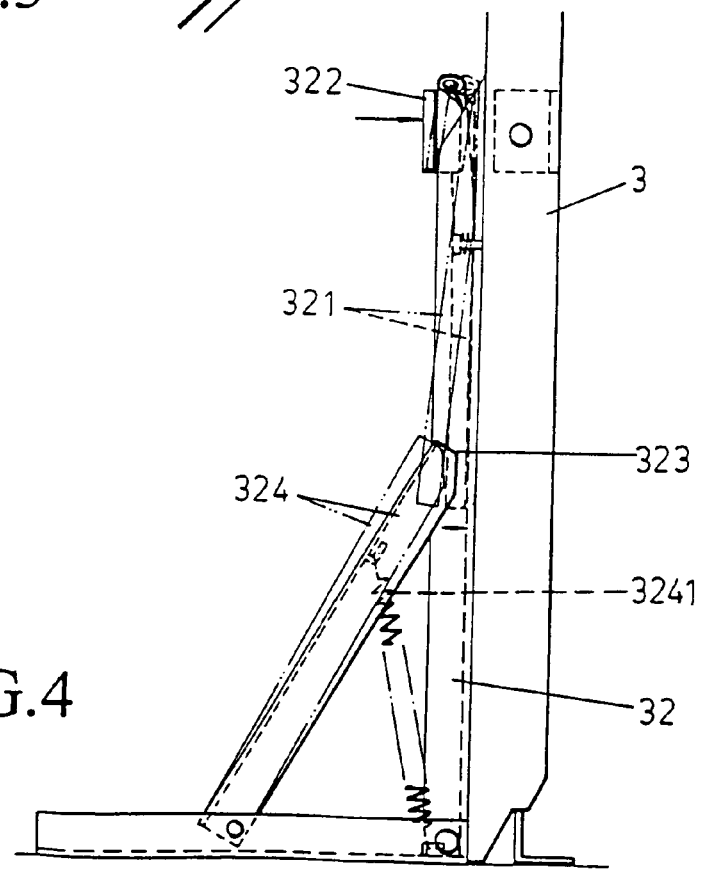
FIG. 4 shows a schematic side view of the seat frame and the body member according to the present invention.

Referring to FIGS. 3 and 4, a seat 31 is installed atop the seat frame 3 configured at a rear portion of the body member 1, and a brake light 311 is configured at a rear portion of the seat 31 (see FIG. 2). The seat frame 3 can be folded flat within the body member 1, and can be pulled back to an upright position thereby enabling a rider to sit atop the seat 31. Folding structure of the seat frame 3 comprises a pair of C-shaped bars 32 respectively bolted to two front sides of the seat frame 3. A movable strip 321 is configured interior of each of the bars 32, and a holding bar 322 is configured between and joins extremities of the two movable strips 321. A notch 323 is appropriately formed at a central portion of each bar 32, and the notches 323 provide for respectively engaging two inclined wedge pieces 324 A spring 3241 is connected to an underside of each wedge piece 324. Referring to FIG. 4, when a user wishes to fold away the seat frame 3, the user needs only to firmly grasp the holding bar 322 and push down, thereby enabling the movable strips 321 to outwardly push the wedge pieces 324, to disengage the wedge pieces 324 from the notches 323, whereupon the entire seat frame 3 is thereby enabled to be folded and concealed within the body member 1.

Figure 7:
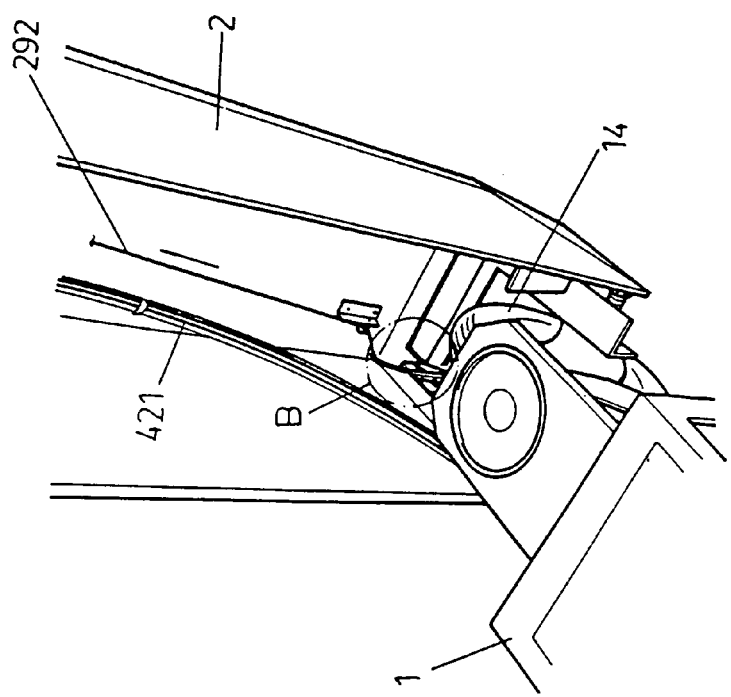
FIG. 7 shows another partial structural view of the cover member lifted up according to the present invention.
Figure 6:
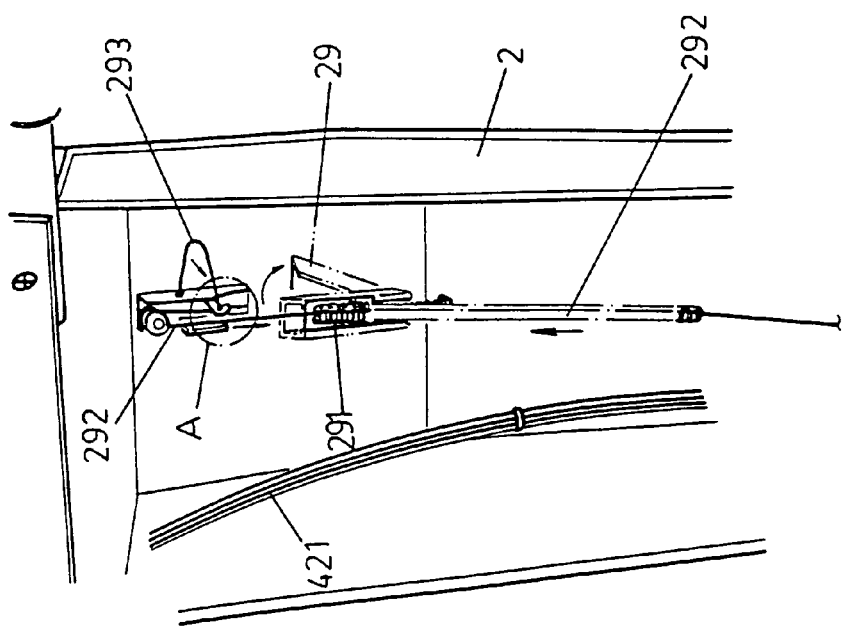
FIG. 6 shows a partial structural view of the cover member lifted up according to the present invention.
Figure 8:
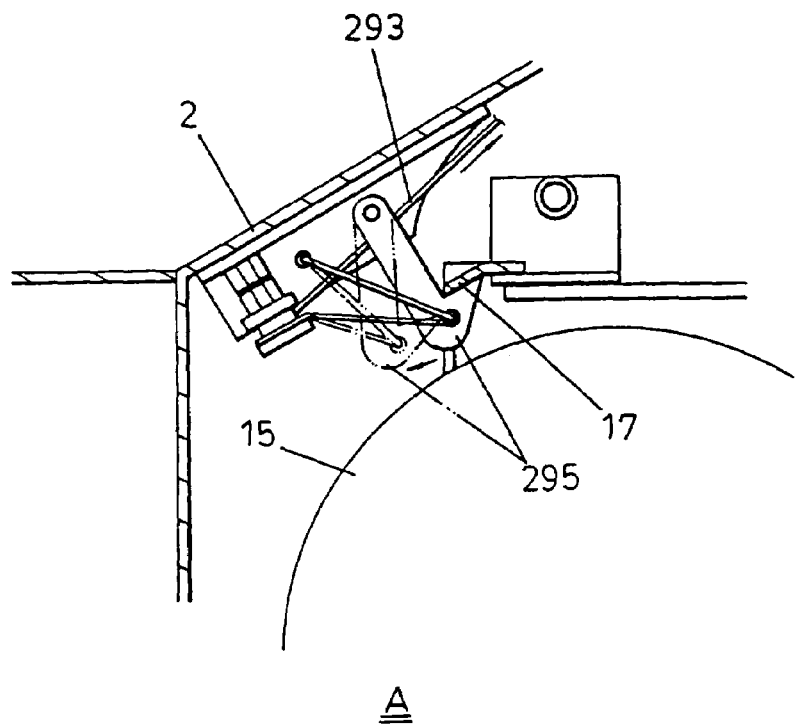
FIG. 8 shows a structural view of A-section of FIG. 6 according to the present invention.
Figure 9:
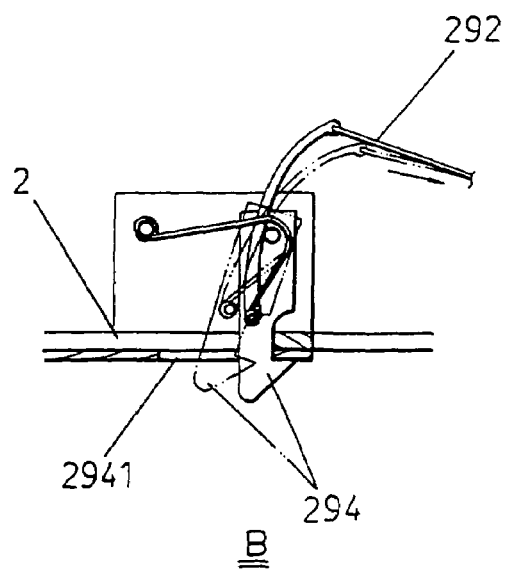
FIG. 9 shows a structural view of B-section of FIG. 7 according to the present invention.

Referring to FIG. 1, a foldaway carry handle 24 is configured on top of the cover member 2, wherewith enables the present invention to be lifted by hand. A headlight 25 is configured at a side of the carry handle 24, and a power switch 26 and a battery charge switch cover 27 are configured on a side face of the cover member 2. A three-fold panel is configured on a frontal section at a tail end of the cover member 2, therewith enabling covering of a frontal end of the body member 1. Referring to FIG. 5, a power indicator light 296 is configured on an end of the cover member 2 close to the handle 4. A brake 42 is bolted to the handle 4, and the brake 42 is connected to a braking system by means of a brake cable (see FIGS. 6 and 7). A movable pull-bar 29 is configured on a back of the cover member 2, and referring to FIG. 6, the user can upwardly pull the movable pull-bar 29, whereupon the movable pull-bar 29 having a spring 291 configured therein tugs on two pull cables 292 and 293, thus enabling a fastening hook 294 to disengage fastening from a locating hole 2941 of the front wheel frame 141 of the cover member 2 (see FIG. 9), while another fastening hook 295 disengages fastening from a fastening edge 17 of a rear wheel frame of the body member 1 (see FIG. 8). FIG. 2 shows the electric scooter opened up, whereupon the cover member 2 instantly forms a front frame of the electric scooter, and serves as a shield to protect from wind and rain, similar to a conventional motor scooter.

Figure 10:
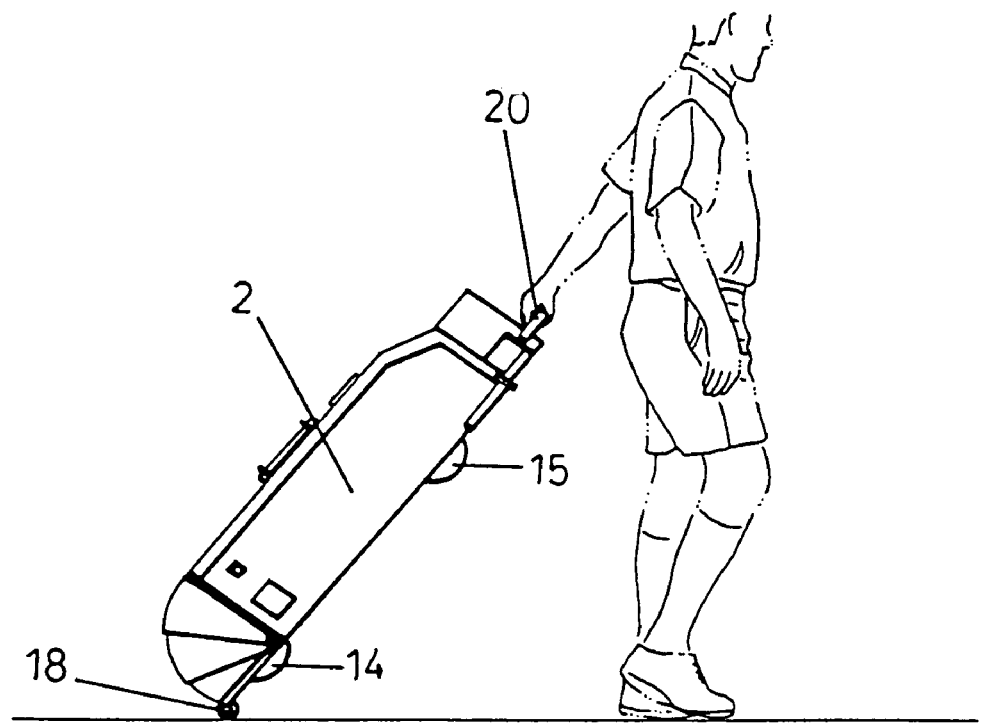
FIG. 10 shows a schematic view of an embodiment according to the present invention.

Furthermore, two auxiliary wheels 18 are provided on a frontal section of the front wheel 14 of the body member 1 (see FIG. 1). A foldaway pull rod 20 is configured on a frontal section of the cover member 2 (see FIG. 2). Upon the present invention being folded and thus forming a baggage-like as shown in FIG. 10 the user can pull the pull rod 20, to move the scooter on the ground by means of the auxiliary wheels 18, similar to the pulling of a baggage.

In conclusion, the present invention employs three simple actions to facilitate rapid folding away and formation of a baggage-like body that is portable or utilizes the configured auxiliary wheels 18 to enable the user to pull along the scooter into rapid transit transportation stations, and so on. The electric scooter of the present invention thus provides for transportability and easy storing thereof. Hence, when the user wishes to ride the scooter, the user needs only to implement three simple maneuvers to open up the folded scooter, namely to pull open the cover member 2, the seat frame 3 and the two handles 4 and 5, thereby quickly assembling the electric scooter for the user to ride thereon.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A folding and portable electric scooter comprising a body member, a cover member, a seat frame and two handles respectively secured to two handle bars, wherein the body member has an interior and a transmission device comprising an electric motor, a battery and a belt installed in said interior in said body member; a front wheel and a rear wheel pivotally jointed to a front and a rear portion of the body member respectively, and a foot stand fixedly positioned to a side of the body member; and wherein the electric motor drives the belt, and the belt is wound on a hub at a side of the rear wheel; the improvement which comprises:

the cover member pivotally jointed to a wheel frame of the front wheel, and the two handles configured on a movable end of the cover member; a reverse U-shaped bracket bolted into the cover member, and a reverse U-shaped fastening bracket configured atop the reverse U-shaped bracket; the fastening bracket downwardly bent to form a pair of neck members, having each said neck member formed with a fastening hook thereon, two fastening holes defined in said two handle bars for respectively engaging the fastening hooks of the fastening bracket; a recess hole defined in each end atop the fastening bracket, and a fixing bolt bolted into each said recess hole, whereby upon altering of the position of the fixing bolts within the recess holes, the handle bars can be fastened or loosened for unfolding or folding the electric scooter; and upon folding of the electric scooter, the cover member completely covers the body member, and upon unfolding of the electric scooter for use, the cover member functions as a front frame for the electric scooter;

a seat installed atop the seat frame configured at a rear portion of the body member, and wherein the seat frame can be folded away into the body member; a pair of bars respectively bolted to two front sides of the seat frame, and a pair of movable strips each configured in an interior of each said bar, a holding bar joining the two movable strips; a notch defined in each said bar and two inclined wedge pieces each engaged with each said notch; a spring connected to an underside of each of the wedge piece; whereby upon downward pushing of the holding bar to enable the movable strips to outwardly push the wedge pieces, to disengage the wedge pieces from the notches, the seat frame can be folded.

2. The folding and portable electric scooter in accordance with claim 1, wherein a foldaway carry handle is configured on top of the cover member, a headlight configured at a side of the carry handle; a power switch and a battery charge switch cover configured on a side face of the cover member, and a folding panel configured on a frontal section at a tail end of the cover member.

3. The folding and portable electric scooter in accordance with claim 1, wherein a brake device is bolted to the handle, and the brake device is connected to a braking system by means of a brake cable.

4. The folding and portable electric scooter in accordance with claim 1, wherein a movable pull-bar is configured on a back of the cover member operatively tugging two pull cables, the two pull cables respectively operatively actuating two fastening hooks to respectively disengage a locating hole of the wheel frame of the front wheel of the cover member and to disengage a fastening edge of a rear wheel frame of the body member for opening up the electric scooter.

5. The folding and portable electric scooter in accordance with claim 1, wherein two auxiliary wheels are configured on a frontal section of the front wheel of the body member, and a pull rod is configured on a frontal section of the cover member.

6. The folding and portable electric scooter in accordance with claim 1, wherein a brake light is configured at a rear portion of the seat installed atop the seat frame.

* * * * *